(12) United States Patent
Yang et al.

(10) Patent No.: US 10,384,531 B2
(45) Date of Patent: Aug. 20, 2019

(54) UNIVERSAL WHEEL (71) Applicants: Chun-Hsiang Yang, Taipei (TW);
Hsiu-Fang Chang, Taipei (TW)

(72) Inventors: Chun-Hsiang Yang, Taipei (TW);
Hsiu-Fang Chang, Taipei (TW)

( * ) Notice: Subject to any disclaimer, the term of this patent is extended or adjusted under 35 U.S.C. 154(b) by 0 days.

(21) Appl. No.: 15/836,899

(22) Filed: Dec. 10, 2017

(65) Prior Publication Data
US 2018/0099555 A1    Apr. 12, 2018

Related U.S. Application Data (63) Continuation-in-part of application No. 15/173,617, filed on Jun. 4, 2016, now abandoned.

(51) Int. Cl.
| | | |
|---|---|---|
| *B60K 7/00* | (2006.01) | |
| *B62B 5/00* | (2006.01) | |
| *B60B 33/00* | (2006.01) | |
| *B60B 33/02* | (2006.01) | |
| *B62D 7/02* | (2006.01) | |
| *B60K 17/30* | (2006.01) | |
| *B62D 5/04* | (2006.01) | |

(52) U.S. Cl.
CPC ........ *B60K 7/0007* (2013.01); *B60B 33/0018* (2013.01); *B60B 33/026* (2013.01); *B60K 17/30* (2013.01); *B62D 5/0418* (2013.01); *B62D 7/026* (2013.01); *B60K 2007/003* (2013.01); *B60K 2007/0038* (2013.01); *B60K 2007/0084* (2013.01); *B60K 2007/0092* (2013.01); *B62B 5/004* (2013.01)

(58) Field of Classification Search
CPC ............ B60B 33/0021; B60B 33/0018; B60B 33/026; B60K 2007/003; B60K 2007/0038; B60K 2007/0084; B60K 2007/0092; B60K 7/0007
See application file for complete search history.

(56) References Cited

U.S. PATENT DOCUMENTS

| | | | | |
|---|---|---|---|---|
| 4,178,007 A | * | 12/1979 | Martineau | ............... B60B 33/00 16/35 D |
| 5,547,038 A | * | 8/1996 | Madwed | ............... B60K 7/0007 180/253 |
| 5,590,605 A | * | 1/1997 | Salter | ..................... A63G 25/00 104/139 |
| 6,491,127 B1 | * | 12/2002 | Holmberg | ............ B60K 7/0007 180/21 |

(Continued)

*Primary Examiner* — Jeffrey O'Brien
(74) *Attorney, Agent, or Firm* — Leong C. Lei (57) ABSTRACT

The universal wheel includes a base member, a vertical axle, a lift member, and a wheel member. The lift member adjusts the universal wheel's height. A first driving element, a second driving element, and an engaging element are configured on the base member and the wheel member. The first driving element for turning the base member laterally within 360 degrees. The second driving element is for rolling the wheel member around its lateral axle. The engaging element couples or decouples an external shaft with the lateral axle of the wheel member. As such, through the first and second driving elements, and the engaging element, the universal wheel can control a height from the ground and can be rolled forward, laterally, obliquely, turned 360 degrees when standing in place, or in a combination of these operations.

5 Claims, 7 Drawing Sheets

(56) References Cited

U.S. PATENT DOCUMENTS

| | | | | |
|---|---|---|---|---|
| 6,668,965 B2* | 12/2003 | Strong | | B60B 33/0002 16/35 R |
| 7,100,722 B2* | 9/2006 | Bowen | | B60K 7/0007 180/65.51 |
| 7,886,377 B2* | 2/2011 | Hamberg | | A61G 7/0528 5/600 |
| 8,046,871 B2* | 11/2011 | Yamauchi | | B60B 33/0007 16/45 |
| 8,240,410 B2* | 8/2012 | Heimbrock | | A61G 7/018 180/19.1 |
| 8,292,327 B2* | 10/2012 | Araya Moreno | | B60B 33/0005 16/35 R |
| 8,365,353 B2* | 2/2013 | Block | | B60B 33/0007 16/35 R |
| 8,387,209 B2* | 3/2013 | Aubin | | B60B 33/0015 16/20 |
| 8,484,801 B2* | 7/2013 | Li | | B60B 7/02 16/18 CG |
| 8,661,615 B1* | 3/2014 | Li | | B60B 33/0002 16/18 R |
| 8,678,677 B2* | 3/2014 | Jensen | | F16M 11/14 16/45 |
| 8,739,364 B2* | 6/2014 | Fromm | | B60B 33/0023 16/19 |
| 9,420,740 B2* | 8/2016 | Ishii | | A01D 34/64 |
| 9,429,180 B2* | 8/2016 | Frame | | F16B 39/02 |
| 2001/0011611 A1* | 8/2001 | Poerschmann | | B60K 1/02 180/65.1 |
| 2005/0138768 A1* | 6/2005 | Kuo | | B60B 33/001 16/38 |
| 2005/0236208 A1* | 10/2005 | Runkles | | A61G 5/045 180/254 |
| 2006/0156511 A1* | 7/2006 | Li | | B60B 3/0007 16/20 |
| 2007/0056140 A1* | 3/2007 | Yamauchi | | B60B 33/0007 16/18 B |
| 2007/0056141 A1* | 3/2007 | Armano | | B60B 33/0007 16/35 R |
| 2009/0205908 A1* | 8/2009 | Hammonds | | B64F 1/22 187/222 |
| 2009/0322492 A1* | 12/2009 | Hannah | | A47F 10/04 340/10.5 |
| 2010/0155168 A1* | 6/2010 | Mies | | B60G 7/001 180/300 |
| 2010/0162520 A1* | 7/2010 | Yamauchi | | B60B 33/0007 16/45 |
| 2013/0160237 A1* | 6/2013 | Shih | | B60B 33/021 16/47 |
| 2014/0137368 A1* | 5/2014 | Frame | | F16B 39/02 16/19 |
| 2014/0250628 A1* | 9/2014 | Tsai | | B60B 33/0007 16/47 |
| 2015/0031269 A1* | 1/2015 | Kulich | | A63H 17/262 446/457 |
| 2015/0239290 A1* | 8/2015 | McKay | | B60T 1/04 16/35 R |

* cited by examiner

UNIVERSAL WHEEL

CROSS-REFERENCE TO RELATED APPLICATION

This application is a continuation-in-part of U.S. patent application Ser. No. 15/173,617, filed Jun. 4, 2016, the disclosure of which are incorporated herein by reference in their entireties.

BACKGROUND OF THE INVENTION

(a) Technical Field of the Invention

The present invention is generally related to universal wheels, and more particular to a universal wheel whose height may be adjusted and which is driven by driving elements so that the wheel provides movements toward various directions and laterally within 360 degrees.

(b) Description of the Prior Art

When a vehicle or other device with wheels moves, the vehicle or the device usually can only move forward or backward, and cannot spin 360 degrees in place, and cannot control how high the vehicle or device body is above the ground.

In addition, the wheels usually cannot be controlled accurately and may need significant leeway to steer the vehicle or device into place (similar to curbside parking), and a driver of the vehicle should have certain skill and experience to operate the vehicle so as to avoid scratch or collision to the vehicle. There are universal wheels that can be turned in place within 360 degrees, but these universal wheels usually involve a number of wheel members and as such are complicated and costly.

SUMMARY OF THE INVENTION

Therefore, the present invention teaches a universal wheel that can control a height from the ground and can be moved forward, laterally, obliquely, turned 360 degrees when standing in place, or in a combination of these operations.

The universal wheel includes a base member having a top side, a pair of downward extended and parallel side pieces from the top side, and a bearing on the top side, a lift member having a bottom end joined to the top side of the base member on the bearing for adjusting a height of the wheel member from the ground, a vertical axle running vertically upward through a fastening element, the top side of the base member, and the bearing, where a first end of the vertical axle is joined to the bottom end of the lift member, a second end of the vertical axle has flange segments for engaging with the fastening element, a wheel member having a lateral axle whose two ends are joined to the side pieces, respectively, so that the wheel member is rotatable between the side pieces around the lateral axle, a first driving element for engaging the bottom end of the lift member and therefore turning the base member laterally within 360 degrees around the vertical axle, a second driving element coupled to the lateral axle of the wheel member for rolling the wheel member around the lateral axle, and a tubular element configured on a second side piece and coupled to the lateral axle of the wheel member, where the tubular element has a number of ribs around an inner wall of the tubular element for detachably engaging an external shaft. The vertical axle and the lift member do not laterally turn along with the base member due to the bearing.

Specifically, the first driving element is configured on the base member.

Specifically, the first driving element is a motor.

Specifically, the second driving element is configured on a first side piece of the base member.

Specifically, the second driving element is a motor.

Specifically, the universal wheel according further includes an engaging element configured on the tubular element for coupling and decoupling the external shaft with the tubular element.

Specifically, the engaging element is a hydraulic device.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
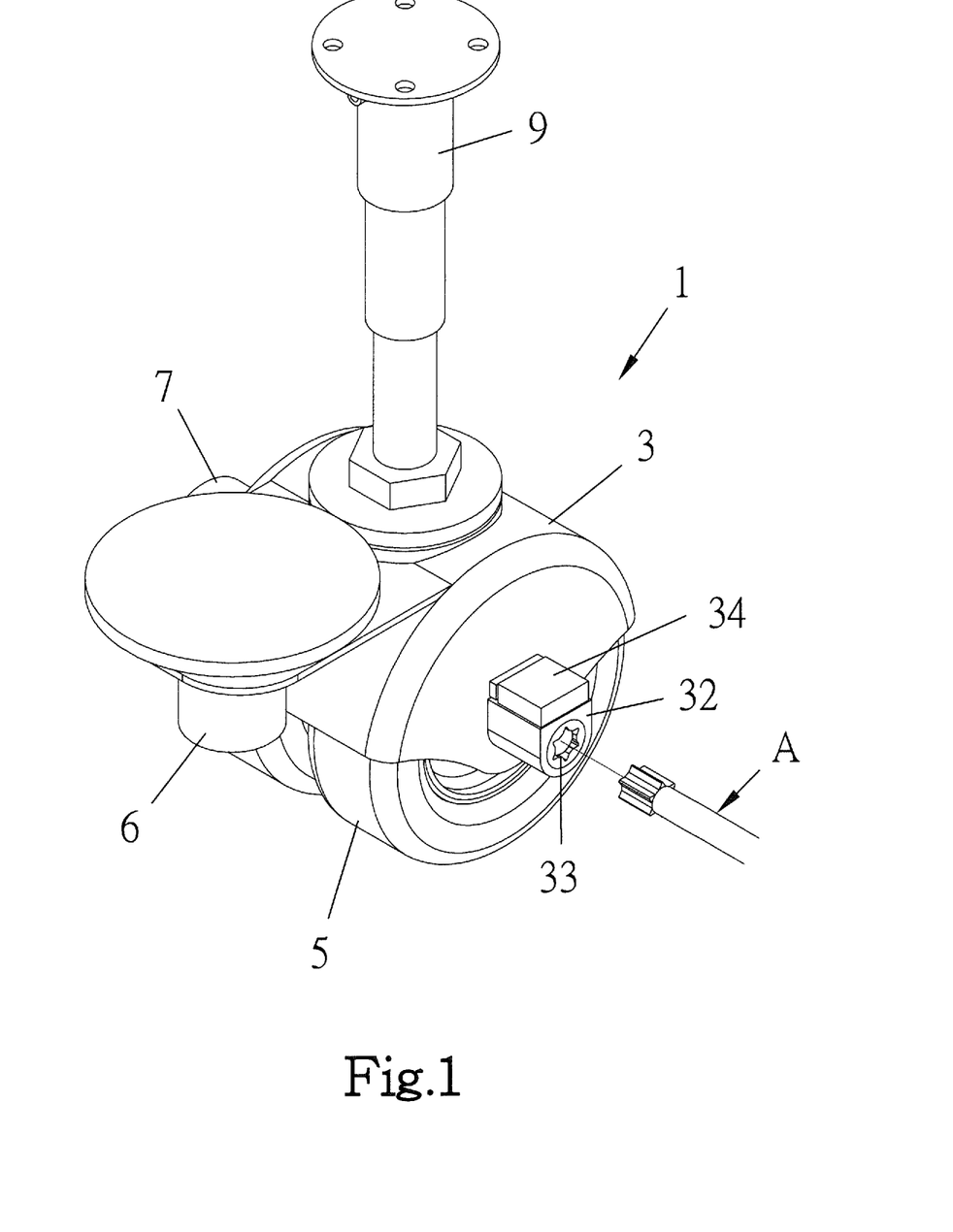
FIG. 1 is a perspective diagram showing a universal wheel according to an embodiment of the present invention.
Figure 2:
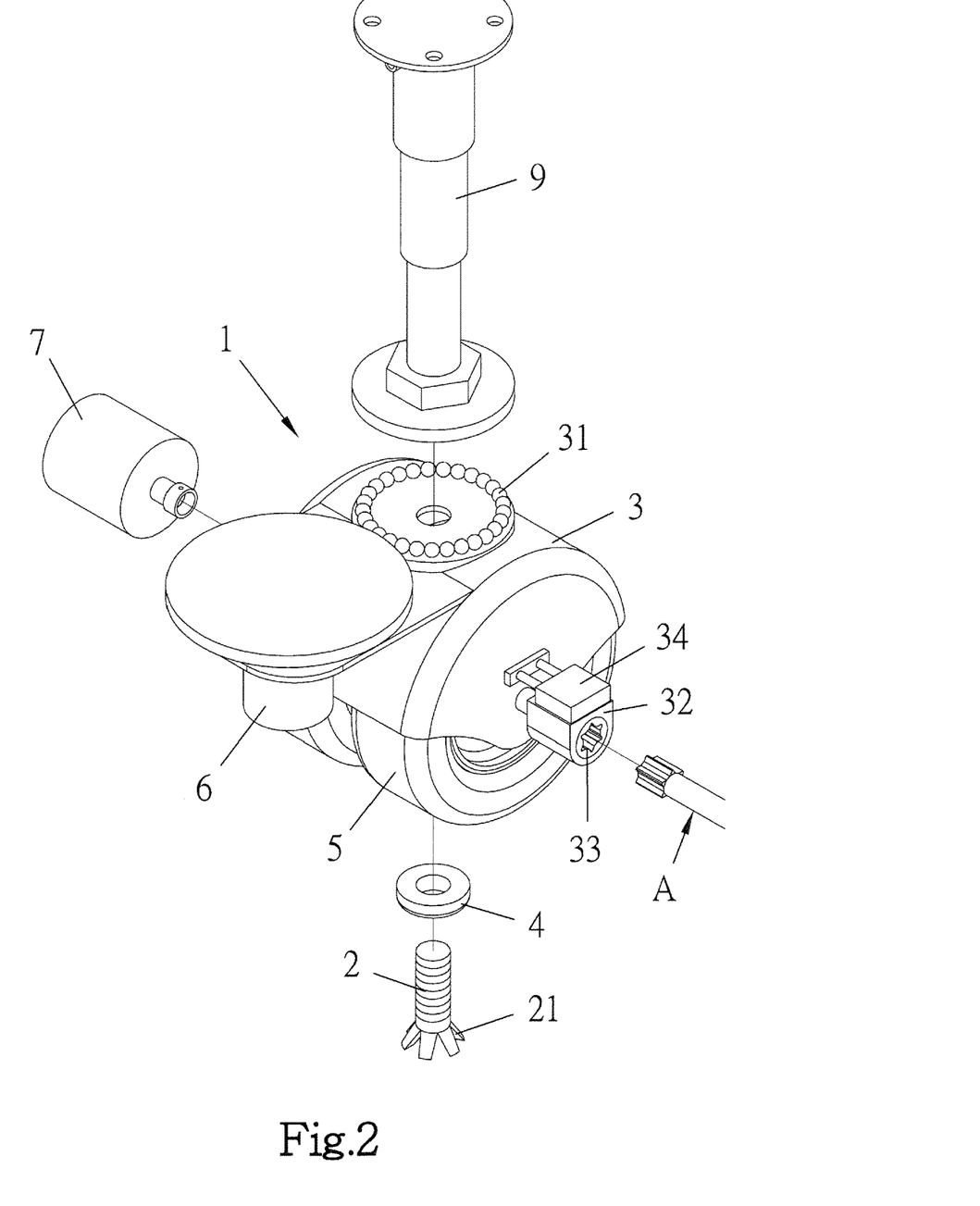
FIG. 2 is a perspective break-down diagram showing the universal wheel of FIG. 1.

As shown in FIGS. 1 and 2, a universal wheel 1 according to an embodiment of the present invention includes a vertical axle 2, a base member 3, a telescoping and adjustable lift member 9, and at least a wheel member 5. A first end of the vertical axle 2 is joined to a bottom end of the lift member 9, and a second end of the vertical axle 2 is joined to the base member 3. The lift member 9 adjusts a height of the universal wheel 1 from the ground.

A bearing 31 is laid on a top side of the base member 3 and beneath the bottom end of the lift member 9. The vertical axle 2 runs vertically upward through a fastening element 4, the top side of the base member 3, and the bearing 31. The second end of the vertical axle 2 has flange segments 21 for engaging with the fastening element 4.

The base member 3 has a pair of downward extended and parallel side pieces (not numbered) between which the wheel member 5 is rotatably joined by a lateral axle of the wheel member 5. A first driving element 6 is configured on the base member 3 engaging the bottom end of the lift member so as to turn the base member 3 and therefore the wheel member 5 laterally within 360 degrees around the vertical axle 2 smoothly with the help of the bearing 31. Due to the bearing 31, the vertical axle 2 and the lift member 9 do not turn along with the base member 3 and the wheel member 5. The lateral axle of the wheel member 5 is coupled to a second driving element 7 configured on a first side piece. The second driving element 7 engages the lateral axle of the wheel member 5 so that the wheel member 5 rolls around the lateral axle. A tubular element 32 coupled to the lateral axle of the wheel member 5 is configured on a second side piece. The tubular element 32 has a number of ribs 33 around an inner wall of the tubular element 32. An external shaft A may engages the tubular element 32 through the ribs 33 to roll the wheel member 5.

An engaging element 34 is configured on the tubular element 32 for coupling and decoupling the external shaft A with the tubular element 32. When the engaging element 34 decouples the external shaft A with the tubular element 32, the base member 3 along with the wheel member 5 may be turned laterally within 360 degrees by the first driving element 6, or the wheel member 5 may be rolled by the second driving element 7. When the engaging element 34 couples the external shaft A with the tubular element 32, the wheel member 5 may be rolled by the external shaft A. In the present embodiment, the engaging element is a hydraulic device.

Figure 3:
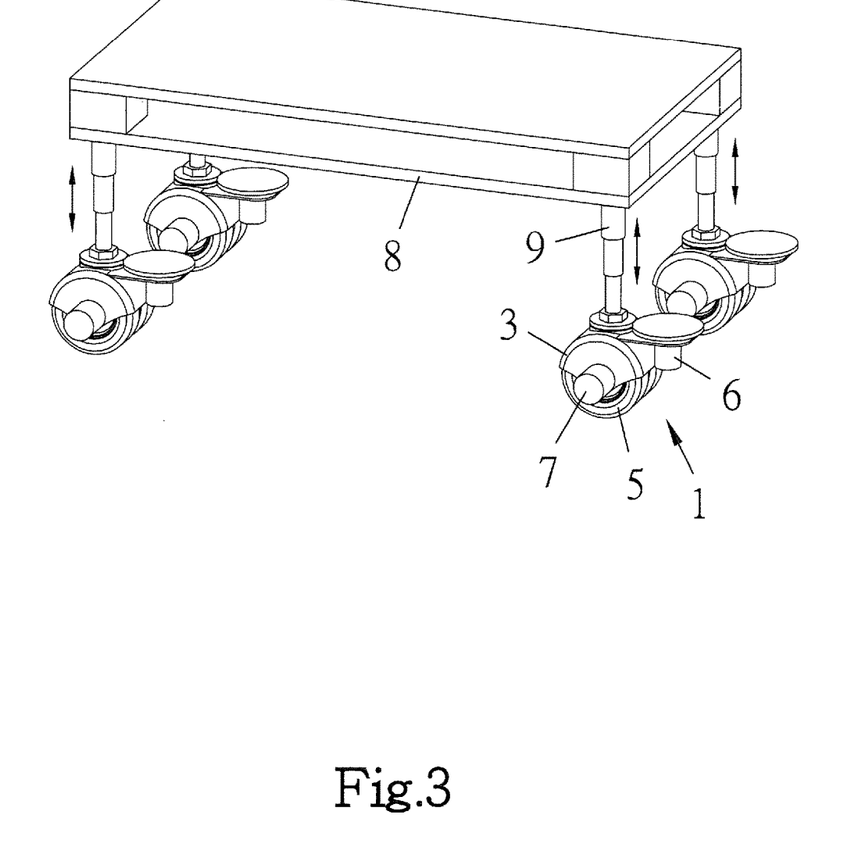
FIG. 3 is a perspective diagram showing the universal wheel of FIG. 1 applied to a cart.
Figure 4:
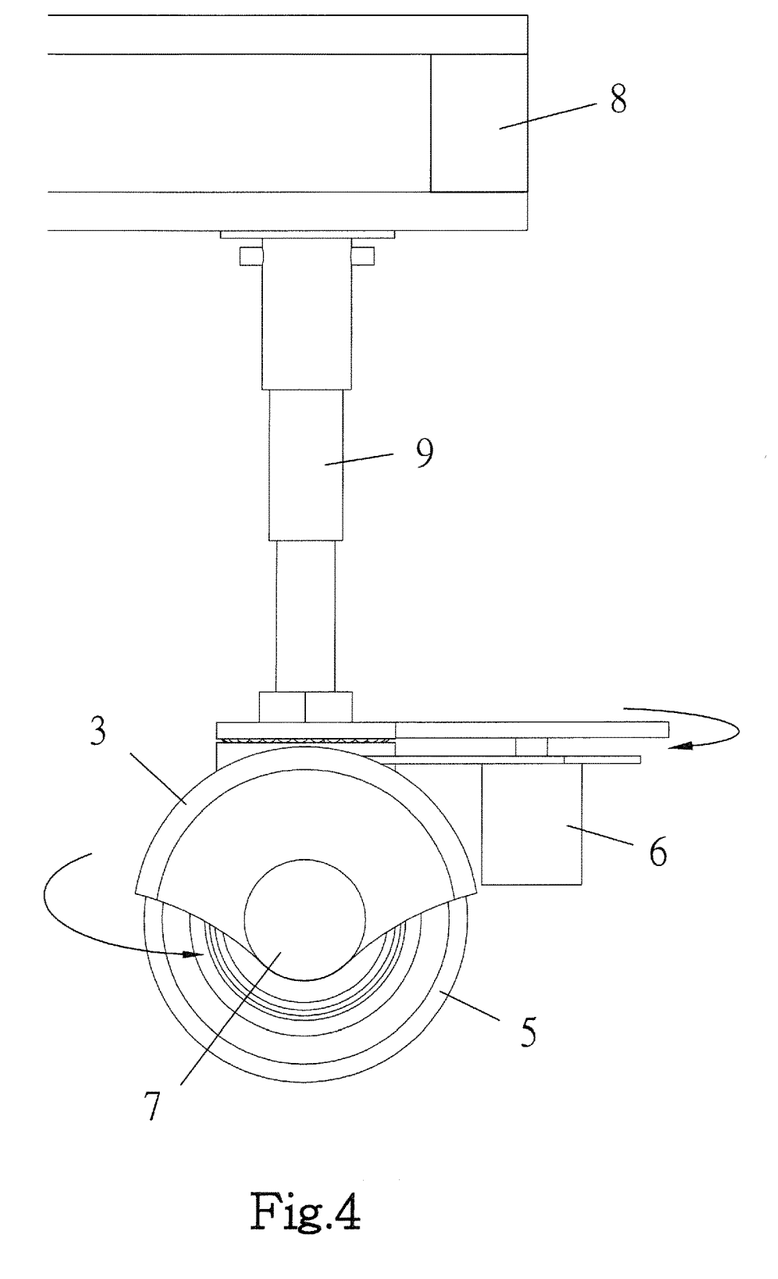
FIG. 4 is a schematic diagram showing a first driving element of the universal wheel of FIG. 1 being driven.
Figure 5:
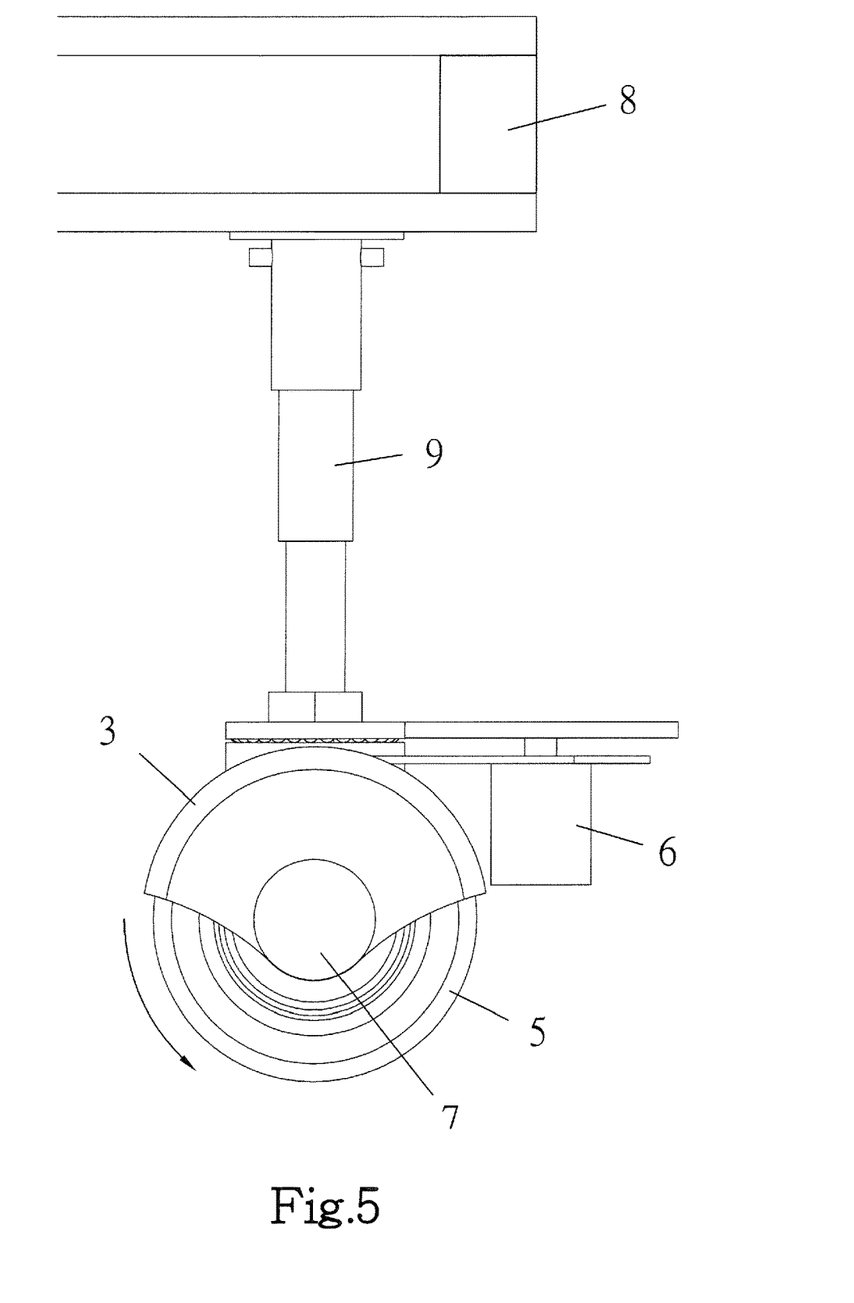
FIG. 5 is a schematic diagram showing a second driving element of the universal wheel of FIG. 1 being driven.

As shown in FIGS. 3 to 5, the lift member 9 has a top end fixedly joined to a bottom side of a platform 8 of a cart so that the universal wheel 1 is configured beneath the platform 8. The platform 8's height from the ground therefore may be adjusted through the lift member 9. To move the cart around, the first driving element 6 may turn the base member 3 as well as the wheel member 5 laterally for 360 degrees so as to change the cart's moving direction. Then the second driving element 7 may rolls the wheel member 5 forward or backward so as to move the cart. As such, the universal wheel 1 can be rolled forward, laterally, obliquely, turned 360 degrees when standing in place, or in a combination of these operations. The first and second driving elements 6 and 7 are motors in the present embodiment.

Figure 6:
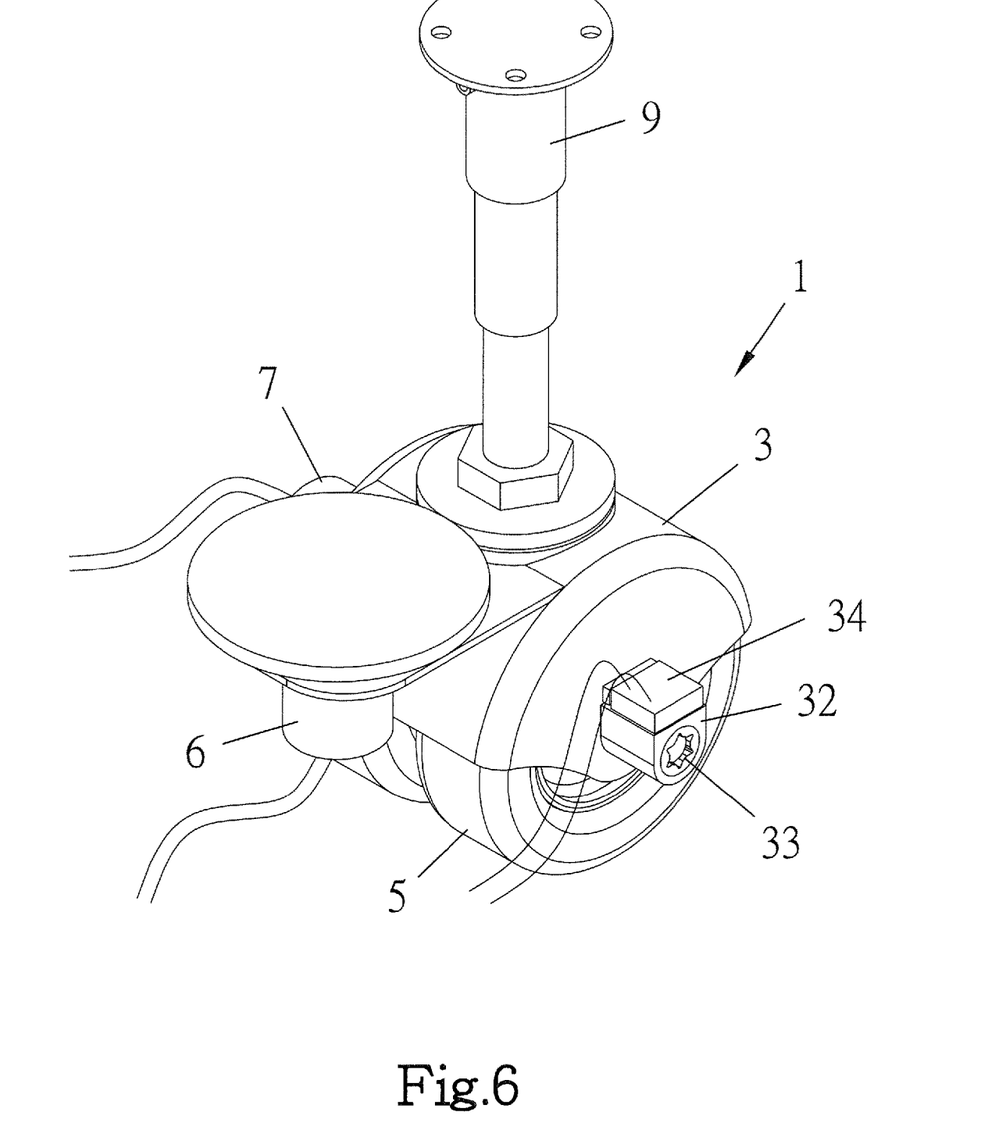
FIG. 6 is another perspective diagram showing the universal wheel of FIG. 1.

As shown in FIG. 6, the first and second driving elements 6 and 7, and the engaging element 34 may be controlled remotely, automatically, or manually.

Figure 7:
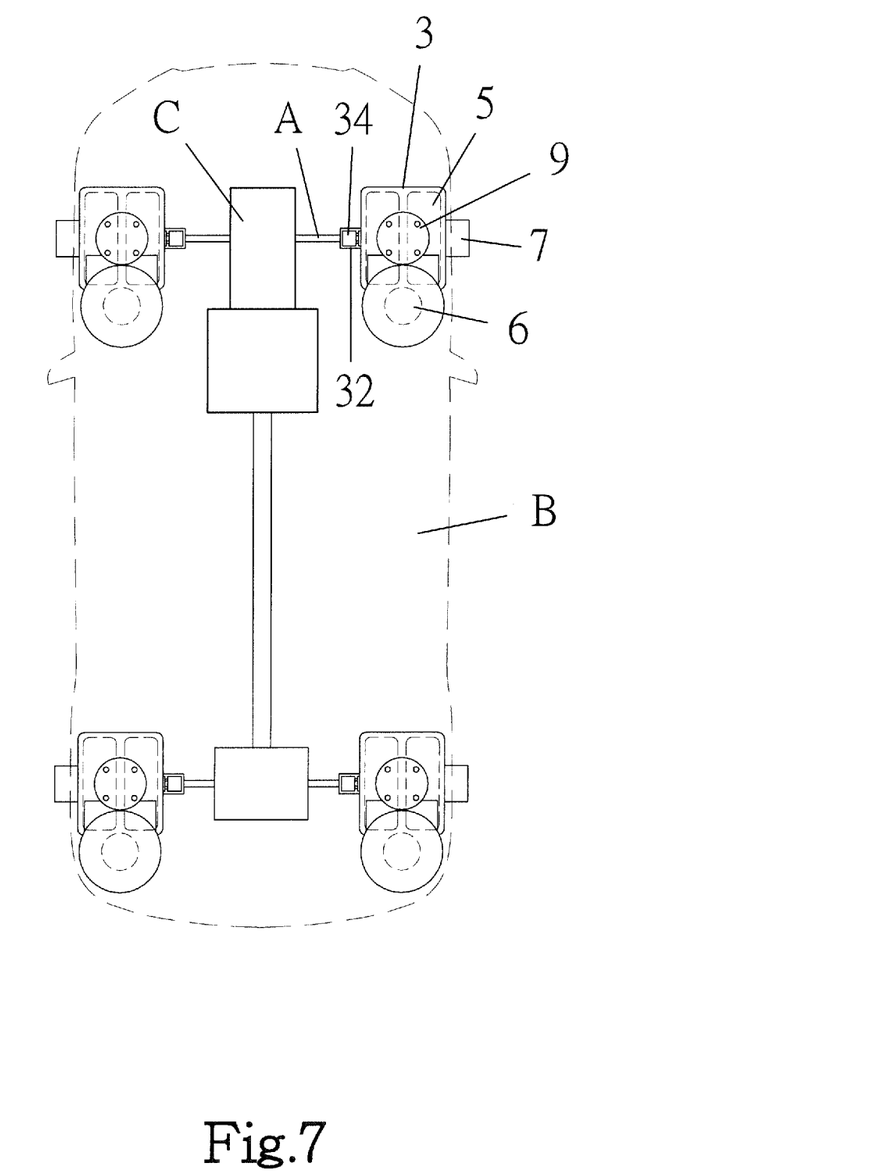
FIG. 7 is a schematic diagram showing the universal wheel of FIG. 1 applied to a vehicle.

As shown in FIG. 7, the universal wheel 1 is joined to a bottom side of a vehicle's chassis B which also includes at least one external shaft A and a motor C. When the motor C is started, the external shaft A is coupled to the tubular element 32 by the engaging element 34, the motor C drives the external shaft A as well as the wheel member 5 to roll, and therefore the vehicle is moved. After decoupling the external shaft A with the tubular element 32 by the engaging element 34, the base member 3 as well as the wheel member 5 may be turned laterally for 360 degrees. Even when the motor C cannot be started, the wheel member 5 can still be rolled by the second driving element 7. In this way, when the motor C fails, a driver of the vehicle does not need to manually push the vehicle around.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A universal wheel, comprising
   a base member having a top side, a first side piece and a second side piece extending parallel to one another and downward from the top side, and a bearing on the top side;
   a lift member having a bottom end joined to the top side of the base member on the bearing for adjusting a height of the wheel member from the ground;
   a vertical axle running vertically upward through a fastening element, the top side of the base member, and the bearing, where a first end of the vertical axle is joined to the bottom end of the lift member, a second end of the vertical axle has flange segments for engaging with the fastening element;
   a wheel member having a lateral axle whose two ends are joined to the first and second side pieces, respectively, so that the wheel member is rotatable between the first and second side pieces around the lateral axle;
   a first driving element connected on the base member and engaging the bottom end of the lift member for turning the base member with respect to the lift member laterally within 360 degrees around the vertical axle;
   a second driving element connected on the first side piece and coaxially coupled to the lateral axle of the wheel member for rolling the wheel member around the lateral axle; and
   a tubular element configured on the second side piece and coupled to the lateral axle of the wheel member, where the tubular element has a plurality of ribs around an inner wall of the tubular element for detachably engaging an external shaft;
   wherein the vertical axle and the lift member do not laterally turn along with the base member due to the bearing.

2. The universal wheel according to claim 1, wherein the first driving element is a motor.

3. The universal wheel according to claim 1, wherein the second driving element is a motor.

4. The universal wheel according to claim 1, further comprising an engaging element configured on the tubular element for coupling and decoupling the external shaft with the tubular element.

5. The universal wheel according to claim 4, wherein the engaging element is a hydraulic device.

* * * * *